Patented Oct. 27, 1925.

1,559,516

UNITED STATES PATENT OFFICE.

JOSEPH BRESLAUER, OF GENEVA, SWITZERLAND, AND GEORGES DARIER, OF BORDIGHERA, ITALY, ASSIGNORS TO SOCIÉTÉ D'ÉTUDES CHIMIQUES POUR L'INDUSTRIE, OF GENEVA, SWITZERLAND, A CORPORATION OF SWITZERLAND.

MANUFACTURE OF NITROGENIC AND PHOSPHATIC COMBINATIONS.

No Drawing. Original application filed September 18, 1920, Serial No. 411,074. Divided and this application filed May 29, 1925. Serial No. 33,835.

*To all whom it may concern:*

Be it known that we, JOSEPH BRESLAUER, a citizen of Switzerland, residing at Geneva, Switzerland, and GEORGES DARIER, a citizen of Switzerland, residing at Bordighera, in Italy, have invented certain new and useful Improvements in Manufacture of Nitrogenic and Phosphatic Combinations, of which the following is a specification.

Our present invention relates to a process of producing fertilizers and, more particularly, to a process of transforming crude calcium cyanamid to substances which may be mixed with other fertilizing materials, such as phosphates, in the formation of a complete fertilizer.

The present application is a division of our co-pending application Serial No. 411,074, filed Sept. 18th, 1920.

Calcium cyanamid or raw cyanamid possesses physical characteristics which render its application as a fertilizer difficult and has an alkalinity, due to the presence of lime or loosely combined calcium, that causes it to react with acid phosphates with which it may be mixed, changing them to insoluble phosphates, and thus renders it difficult or impossible to combine the nitrogenic constituents of the raw cyanamid with soluble or acid phosphates requisite in the formation of a complete fertilizer. These obstacles are overcome in the process described in the above application, from which the present application is divided, by transforming the raw cyanamid into free cyanamid and thence into urea or salts of urea which may be directly mixed with phosphates and other fertilizing materials.

The present invention relates to modifications and improvements on the process of the above identified application and has among its objects to simplify and cheapen the process of forming the urea and the phosphate and nitrogenic compositions; to produce fertilizers of somewhat different physical properties and chemical composition; to provide a process in which the urea may be isolated and the remaining mother liquors utilized in the formation of a nitrogenic and phosphatic fertilizer; and to provide a process in which the acid used in the production of the urea is again utilized in the formation of soluble phosphates.

With these and other objects in view, which will be apparent from the following description, the invention comprises the process described in the following specification and set forth in the claims.

In our present invention, the raw cyanamid or lime nitrogen is transformed into free cyanamid by adding finely divided raw cyanamid in small portions to water and keeping it suspended therein by suitable agitation while the water is continuously supplied with a gaseous acid which forms insoluble compounds with the metallic constituents or impurities of the raw cyanamid. During this decomposition of the cyanamid, the temperature of the water is maintained sufficiently low to avoid or inhibit the polymerization of the free cyanamid to dicyandiamid, a temperature below 40° C. being preferable for this purpose, particularly when a weak acid, such as carbonic acid, is used and the acidity of the solution may become very low. The solution of free cyanamid may be brought to any desired degree of concentration by removing the precipitated insoluble metallic salts and adding further quantities of raw cyanamid and while also adding acid to the clarified solution. The solution of free cyanamid thus obtained is then acidified with sulphuric acid and heated to a temperature sufficient to transform the free cyanamid to acid solution of urea, a temperature of from 60° C. to 70° C. being suitable for this purpose. The urea or acid solution of urea formed in this operation may be crystallized from the solution or may be added directly to a calcium phosphate or other suitable salt with which the free acid of the solution combines and from which soluble phosphate constituents for a complete fertilizer are obtained. The mother liquors remaining from the crystallizing of the urea salts may also be used to convert calcium phosphate to soluble phosphate or may be added to calcium phosphate to which the crude urea solution has been added thereby increasing the quantity of soluble phosphate and adding the nitrogenic compounds present in the mother liquor.

In forming the solution of free cyanamid, any suitable acid may be used to neutralize and remove the calcium and other metallic constituents combined with the cyanamid or present as impurities, but a gaseous acid capable of forming insoluble salts with these metals is preferred. For example sulphur dioxide or carbon dioxide may be used, carbon dioxide being preferable as it is more readily available. The raw cyanamid is added in a finely divided condition in successive small portions and the gaseous acid is supplied in quantities sufficient to precipitate the calcium and other metallic constituents of the raw cyanamid and form a slightly acid solution and is added at a rate relative to the addition of the raw cyanamid to maintain the solution as nearly acid as practicable. During the addition of the raw cyanamid, the solution is vigorously stirred or agitated in order to maintain the particles of raw cyanamid in a finely divided separated condition and suspended in the solution and thus bring the raw cyanamid into the most intimate contact with the carbonic acid solution.

During the addition of the raw cyanamid to the acidified water, excessive heating of the water should be avoided to avoid the polymerization of substantial quantities of the free cyanamid in the solution into dicyandiamid. As considerable heat is liberated in the addition of the cyanamid and formation of the calcium salts, the solution may be cooled artificially when the dissipation of heat is not sufficiently rapid during the addition of the raw cyanamid. The temperature should not be permitted to rise above 40° C. and is preferably held approximately between 30° C. and 40° C.

During the addition of the raw cyanamid, the insoluble or precipitated metallic salts in the solution continuously increase, eventually becoming great enough to interfere with the stirring and circulation of the liquid. To obtain a solution of a greater concentration of free cyanamid than is obtained when this point is reached, the insoluble salts of calcium and other metals are removed from the solution by filtration or equivalent methods and the addition of powdered or finely divided raw cyanamid and carbon dioxide is continued or repeated, the removal of the precipitated salts and further addition of raw cyanamid being repeated until a solution of the desired concentration is obtained. The removed precipitates are then washed with water to remove the traces of free cyanamid adhering thereto and the wash waters are utilized for the preparation of subsequent solutions of free cyanamid by the addition of raw cyanamid and carbon dioxide as described above. The precipitated calcium carbonate may be utilized for neutralizing acid solutions, for the production of Portland cement or for other technical purposes.

The filtered or clarified solution of free cyanamid thus obtained is acidified with sulphuric acid and is then heated to a temperature of from 60° C. to 70° C. and maintained at this temperature for about one half hour to transform the free cyanamid into urea by reaction with the water of the solution, the acid serving to catalyze this reaction and also uniting with the urea thus formed to form acid solution of urea. As dicyandiamid is not formed in acid solution even at these elevated temperatures, the free cyanamid may in this manner be changed to urea without danger of forming appreciable quantities of dicyandiamid.

The urea or acid solution of urea thus formed contains the nitrogen of the cyanamid in a form that may be used directly as a nitrogenic fertilizer or may be mixed with phosphatic and potassium salts to form a complete fertilizer. The urea may be isolated from the solution by evaporating at a low temperature and crystallizing from the solution, leaving a mother liquor containing a quantity of free acids and nitrogenous materials which may be added to phosphatic materials or phosphatic and nitrogenous materials to increase their content of nitrogen. When it is desired to crystallize and isolate the urea in this manner, but a small amount of the sulphuric acid is preferably used.

The solution of urea may be combined directly with phosphates in forming a mixed fertilizer. As the solution contains some free acid and some acid weakly combined with the urea, it may serve for converting insoluble calcium phosphates such as phosphate rock, bone powder, or basic slag, into soluble acid phosphates. By the addition of phosphate rock or other tricalcium phosphates, a fertilizer may be formed having nitrogenic and phosphatic compounds present in any desired proportions, and, as the acid used in converting free cyanamid to urea is used primarily as a catalyzer, it may be added in any desired quantity to the solution of free cyanamid and the quantity may be selected to convert the desired quantity of phosphate rock in the later step of mixing the acid urea solution with the phosphate rock.

The acid solution of urea soluble phosphate, which also contains calcium sulphate, is then evaporated until only sufficient water remains to unite with the calcium sulphate to form crystals similar to plaster of Paris and to thus cause the mass to solidify. Other salts having fertilizing value, such as kainite ($MgSO_4:KCl$) may be added to the solution of urea, or salts may be added to unite with and take up the water of the solution in forming crystals and thus reduce the cost of evaporation.

As an example of the process, finely powdered raw cyanamid is introduced into water in the proportions of 15 kgs. of raw cyanamid to 45 litres of water, while a current of carbon dioxide is continuously supplied to the water and the mixture is vigorously stirred to bring the acid and finely divided raw cyanamid into intimate contact. The raw cyanamid is thus converted into free cyanamid and calcium carbonate according to the equation:

$$CaCN_2 + H_2CO_3 = CaCO_3 + CN_2H_2.$$

The mixture is filtered and the precipitate of insoluble salts washed free of cyanamid for use in a subsequent extraction.

To the filtered solution of free cyanamid there is added about 7 kgs. of concentrated sulphuric acid, and the solution is heated to 70° C. for half an hour. The cyanamid is thereby converted by hydration into urea according to the equation:

$$CN_2H_2 + H_2O = CO\genfrac{}{}{0pt}{}{NH_2}{NH_2}$$

Tricalcium phosphate is then added in quantity sufficient to be completely converted into soluble phosphate as, for example, in accordance with the following equation:

$$Ca_3(PO_4)_2 + H_2SO_4 = CaSO_4 + 2CaHPO_4.$$

The resulting solution is evaporated under a vacuum.

Through the above process, therefore, the raw cyanamid is converted into a nitrogenic compound suitable for mixing with other fertilizing constituents to form a mixed fertilizer without appreciable cost for reagents for this transformation, inasmuch as all of the sulphuric acid used in converting the free cyanamid to urea is again utilized in converting the insoluble phosphates to a soluble form. As the carbon dioxide is readily available for the formation of the solution of free cyanamid, there is, of course, no element of cost in its utilization.

As changes of manipulation could be made within the scope of our invention, it is desired that all matter contained in the above description shall be interpreted as illustrative and not in a limiting sense.

Having described our invention, what we claim and desire to secure by Letters Patent is:

1. A process of the type described which comprises, introducing raw calcium cyanamid in small portions in a finely divided condition into water maintained at a temperature between approximately 30° C. and 40° C., to which is added an acid forming insoluble salts with the metallic impurities of said raw calcium cyanamid to precipitate the impurities of each portion as added, removing the precipitated insoluble salts and converting the resulting free cyanamid in solution to urea by sulphuric acid.

2. A process of the type described which comprises, introducing raw calcium cyanamid in small portions in a finely divided condition into water acidified with carbon dioxide and vigorously agitated, and converting the resulting free cyanamid in solution to urea by the action of sulphuric acid.

3. A process of the type described which comprises, introducing raw calcium cyanamid in small portions in a finely divided condition into water acidified with an acid forming insoluble salts with the metallic impurities of said raw calcium cyanamid, and converting the resulting free cyanamid in solution to urea by sulphuric acid.

4. A process of the type described which comprises, adding finely divided raw calcium cyanamid in successive small portions to water acidified with an acid forming insoluble compounds with metallic constituents of said raw calcium cyanamid, agitating said water during said addition, removing the insoluble salts thus formed, then acidifying said solution with sulphuric acid and heating it to a temperature of approximately 60° C. to 70° C. to transform the free cyanamid in solution to urea.

5. A process of the type described which comprises, adding finely divided raw calcium cyanamid in successive small portions to water while acidified with carbonic acid to form a solution of free cyanamid, agitating said solution while adding said raw calcium cyanamid, removing the insoluble salts thus formed, then acidifying said solution with sulphuric acid and heating it to a temperature of approximately 60° C. to 70° C. to transform the free cyanamid in solution to urea.

6. A process of the type described which comprises, adding finely divided raw calcium cyanamid in successive small portions to water, agitating said water during the addition of said raw calcium cyanamid, maintaining carbonic acid in said solution to precipitate the metallic constituents of said raw calcium cyanamid and slightly acidify said solution, while maintaining said solution at a relatively low temperature to avoid polymerization of the free cyanamid thus formed, removing the insoluble salts from the solution, acidifying the solution with sulphuric acid and heating it to approximately 60° C. to 70° C. to form urea.

7. A process of the type described which comprises, adding finely divided raw calcium cyanamid in successive small portions to water into which there is directed a current of carbon dioxide to precipitate the metallic constituents of said raw calcium cyanamid and slightly acidify the solution, removing the precipitate, acidifying the solution with sulphuric acid and heating it to approximately 60° C. to 70° C. to form urea.

8. A process of the type described which comprises, adding finely divided raw calcium cyanamid in successive small portions to water while dissolving therein carbon dioxide to precipitate the metallic constituents of said raw calcium cyanamid and slightly acidify the solution and constantly agitating said solution during said addition, removing the precipitated salts and repeating the addition of acid and raw calcium cyanamid, said solution being at a relatively low temperature, acidifying the resulting solution with sulphuric acid and heating it to a temperature of approximately 60° C. to 70° C. to hydrate the free cyanamid to urea.

9. A process of the type described which comprises, adding finely divided raw calcium cyanamid in successive small portions to water maintained at a sufficiently low temperature to prevent substantial polymerization of free cyanamid while supplying carbon dioxide in quantity sufficient to precipitate the metallic constituents of said raw cyanamid and to form a slightly acid solution, removing the precipitated compounds and repeating the addition of raw calcium cyanamid to said solution, acidifying the resulting solution with sulphuric acid and heating it to a temperature of from 60° C. to 70° C. to hydrate the free cyanamid to urea.

10. A process of the type described which comprises, adding finely divided raw calcium cyanamid in successive small portions to water while agitated and acidified with carbonic acid, while maintaining said solution at a relative low temperature of approximately 30° C. to 40° C. to avoid the polymerization of the free cyanamid in solution, removing the insoluble salts thus formed and repeating the addition of acid and raw calcium cyanamid to form a concentrated solution of free cyanamid, acidifying said solution with sulphuric acid and heating it to a temperature of from 60° C. to 70° C. to hydrolyze said free cyanamid to urea.

11. A process of the type described which comprises, adding finely divided raw calcium cyanamid in successive small portions to water while acidifying said solution with carbon dioxide at a rate to precipitate the metallic constituents of said raw calcium cyanamid substantially as added and to form a slightly acid solution, said solution being agitated during the addition of the raw calcium cyanamid and maintained at a temperature of approximately between 30° C. and 40° C. to avoid polymerization of the free cyanamid of the solution, acidifying the resulting solution of free cyanamid with sulphuric acid and heating it to a temperature of approximately 60° C. to 70° C. to hydrolyze the free cyanamid in solution to urea.

12. A process of the type described which comprises, adding finely divided raw calcium cyanamid in successive small portions to water acidified with carbonic acid to form a solution of free cyanamid, said solution being agitated during said addition, removing the insoluble salts thus formed, acidifying the resulting solution with sulphuric acid, heating the acidified solution to approximately 60° C. to 70° C. to hydrolyze the free cyanamid in solution to urea, crystallizing the urea from said solution and adding the resulting mother liquors to a phosphate.

13. A process of the type described which comprises, introducing raw calcium cyanamid in small portions in a finely divided condition into an acid solution, heating the resulting free cyanamid in solution acidified with sulphuric acid to form urea, and treating an insoluble phosphate with the resulting acid solution of urea to form a mixed nitrogenic and phosphate fertilizer.

14. A process of the type described which comprises, introducing raw calcium cyanamid in small portions in a finely divided condition into water acidified with carbon dioxide while agitating said solution, removing the insoluble salts thus formed, acidifying the resulting solution with sulphuric acid to hydrolyze the free cyanamid to urea and adding the resulting acid solution of urea to an insoluble phosphate to convert the phosphate to a soluble phosphate.

15. A process of the type described which comprises, introducing raw calcium cyanamid in small portions in a finely divided condition into water acidified with carbon dioxide while agitating said solution, removing the insoluble salts thus formed, acidifying the resulting solution with sulphuric acid to hydrolyze the free cyanamid to urea and adding the resulting acid solution of urea to tricalcium orthophosphate to convert the phosphate to a soluble phosphate.

16. A process according to claim 15 in which a natural phosphate is used as the insoluble phosphate.

17. A process according to claim 15 in which bone powder is used as the insoluble phosphate.

18. A process of the type described which comprises, adding finely divided raw calcium cyanamid in successive small portions to water acidified with carbonic acid to form a solution of free cyanamid, the solution being agitated during said addition, removing the insoluble salts thus formed, acidifying the resulting solution of free cyanamid with sulphuric acid and heating it to approximately 60° C. to 70° C. to hydrolyze the free cyanamid to urea and treating an insoluble phosphate with the resulting acid solution of urea.

19. A process of the type described which comprises, adding finely divided raw calcium cyanamid in successive small portions to water acidified with carbonic acid while continuously agitating the mixture, removing the insoluble salts, acidifying the resulting solution of free cyanamid with sulphuric acid and heating it to a temperature of 60° C. to 70° C. to transform the free cyanamid in solution to urea, treating calcium phosphate with the resulting acid mixture, and evaporating the resulting solution until it forms a solid mass through the crystallization of the calcium sulphate formed in the solution.

20. A process of the type described which comprises, adding finely divided raw calcium cyanamid in successive small portions to water acidified with carbonic acid, while agitating the mixture, removing the insoluble salts thus formed and adding additional quantities of raw calcium cyanamid to form a concentrated solution, acidifying said solution with sulphuric acid and heating it to a temperature of from 60° C. to 70° C. to transform the free cyanamid in solution to urea, treating calcium phosphate with the resulting acid mixture, and evaporating said solution to form a solid fertilizer.

21. A process of the type described which comprises, adding finely divided raw calcium cyanamid in successive small portions to water acidified with carbonic acid, while agitating the mixture, removing the insoluble salts from the solution, acidifying the solution with sulphuric acid, heating the solution to a temperature of from 60° C. to 70° C. to form a solution of urea, crystallizing urea from said solution, and adding the mother liquors and an acid solution of urea to calcium phosphate.

22. A process of the type described which comprises, adding finely divided raw calcium cyanamid in successive small portions to water to which carbon dioxide is supplied in quantity to form insoluble salts with the metallic impurities of the raw calcium cyanamid and slightly acidify the resulting solution, said solution being at a sufficiently low temperature to prevent substantial change in the free cyanamid formed therein, adding sulphuric acid to said solution, heating the acidified solution to a temperature of approximately 60° C. to 70° C. and adding the resulting acid solution or urea to an insoluble phosphate.

23. A process according to claim 21 in which but a small quantity of sulphuric acid is used.

In testimony whereof, we affix our signatures.

JOSEPH BRESLAUER.
GEORGES DARIER.